(12) United States Patent
Hur et al.

(10) Patent No.: US 7,590,611 B2
(45) Date of Patent: Sep. 15, 2009

(54) CLUSTERING METHOD OF WIRELESS SENSOR NETWORK FOR MINIMIZED ENERGY CONSUMPTION

(75) Inventors: Kyeong Hur, Seoul (KR); Chung-gu Kang, Seoul (KR); Il-whan Kim, Incheon (KR); Ki-seok Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 11/412,825

(22) Filed: Apr. 28, 2006

(65) Prior Publication Data

US 2006/0268745 A1    Nov. 30, 2006

(30) Foreign Application Priority Data

May 31, 2005    (KR) .................... 10-2005-0046462

(51) Int. Cl.
*G06F 9/44* (2006.01)
*G06N 7/02* (2006.01)

(52) U.S. Cl. .................... 706/52; 455/456; 709/200; 719/313

(58) Field of Classification Search ............... 706/52; 370/351, 252, 338; 719/313; 455/446
See application file for complete search history.

(56) References Cited

U.S. PATENT DOCUMENTS

| 2002/0080755 A1* | 6/2002 | Tasman et al. | 370/338 |
| 2004/0003111 A1* | 1/2004 | Maeda et al. | 709/237 |
| 2005/0063313 A1* | 3/2005 | Nanavati et al. | 370/252 |

* cited by examiner

*Primary Examiner*—David R Vincent
*Assistant Examiner*—Kalpana Bharadwaj
(74) *Attorney, Agent, or Firm*—Sughrue Mion, PLLC

(57) ABSTRACT

A clustering method of a wireless sensor network is provided to minimize energy consumption. The clustering method includes the operations of determining a number of initial nodes within radio range of ordinary node, the ordinary nodes existing within radio range of a cluster head, and setting an ordinary node having a highest number of initial nodes among the ordinary nodes in the radio range of the cluster head, as a gateway. Because the number of usually large energy consuming cluster heads and gateways can be minimized, energy efficiency of wireless sensor network increases.

16 Claims, 12 Drawing Sheets

- ● CLUSTER HEAD
- ○ INITIAL NODE
- ◉ ORDINARY NODE
- ⊕ GATEWAY

FIG. 2B

- ● CLUSTER HEAD
- ○ INITIAL NODE
- ◉ ORDINARY NODE
- ⊕ GATEWAY

FIG. 3A

- ● CLUSTER HEAD
- ○ INITIAL NODE
- ◎ ORDINARY NODE
- ⊕ GATEWAY

FIG. 3B

- ● CLUSTER HEAD
- ○ INITIAL NODE
- ◎ ORDINARY NODE
- ⊕ GATEWAY

CLUSTERING METHOD OF WIRELESS SENSOR NETWORK FOR MINIMIZED ENERGY CONSUMPTION

CROSS-REFERENCE TO RELATED APPLICATION

This application claims priority from Korean Patent Application No. 10-2005-0046462, filed May 31, 2005, in the Korean Intellectual Property Office, the entire contents of which are incorporated herein by reference.

BACKGROUND OF THE INVENTION

1. Field of the Invention

Methods consistent with the present invention relate to a clustering method of a wireless sensor network (WSN), and more particularly, to a clustering method of a wireless sensor network to minimize energy consumption.

2. Description of the Prior Art

Nodes of WSNs operate on batteries. Because battery power is limited, it is important to design a WSN which minimizes energy consumption.

A clustering method has been proposed with an aim to minimizing energy consumption in the WSN. According to the proposed clustering method, the WSN is divided into a plurality of clusters, and nodes of each cluster take respective roles.

The nodes of the clusters are classified as a cluster head (CH), a gateway (GW) and an ordinary node (ON) according to given roles. A ON detects the event occurring in a corresponding area, and transmits the information to a CH of the same cluster. A CH performs data aggregation with respect to the data received from ONs. A GW routes among neighboring CHs.

The CH performs data aggregation and the GW performs routing, which means that CHs and GWs consume far more energy than ONs. Accordingly, in order to minimize energy consumption in a WSN, it is very important to minimize the number of CHs and GWs.

Available clustering methods mainly include a least identification (ID) clustering, a linked clustering and a topology discovery(TopDisc).

The least ID clustering is based on the IDs of the nodes. More specifically, all the nodes in the cluster initialization stage transmit to the neighboring nodes within the radio range the advertisement message which contains their ID. After completion of the advertisement message transmission, a node with the lowest ID becomes the CH. Accordingly, a node having a lower ID than the other neighboring nodes announces to the neighboring nodes that it is the CH. Next, the CH transmits a beacon signal to the neighboring nodes. At this time, the neighboring nodes receiving the beacon signal from one CH become ONs, while the neighboring nodes receiving the beacon from two or more CHs become GWs.

The least ID clustering has the advantage of simplicity, but since there are many CHs and GWs, which generally consume large amounts of energy, energy consumption increases in the WSN.

The linked clustering allocates unique slots to the nodes in the order of higher IDs. Accordingly, an IN (initial node) having the higher ID announces that it is CH in the first slot allocated to itself, and transmits a beacon signal to the nodes within radio range. INs receiving the beacon signal become ONs. The other INs, which are not turned into ONs, announce that they are CHs in the respectively allocated slots, and transmit a beacon signal to the INs within the radio range. Nodes receiving the beacon signal from two or more CHs become GWs.

The linked clustering has disadvantages in that synchronization in the entire WSN is required for the allocation of slots, and more particularly, since many CHs and GWs are generated, energy consumption increases.

The TopDisc clustering minimizes the number of CHs and GWs by minimizing the distance between CHs and GWs. This method is based on the assumption that the propagation delay time is in proportion to the physical distance between the nodes. More specifically, a CH broadcasts a TopDisc message to the nodes within radio range, and measures transmission delay time of the response messages received from the respective nodes. The CH considers a node with the longest delay time to be the farthest node, and therefore, designates it as a GW. The GW designates the CH of the neighboring cluster in the same method as explained above. This procedure is applied to the overall WSN.

However, when considering the fading or multi-channel routing in the WSN environment, designating GWs and CHs according to the relative distances between the nodes cannot be accurate. Additionally, when considering that the range of WSN is relatively narrow, which is within several meters, the distance between transmission delays is very minute, and thus, it is somewhat improper to designate GWs and CHs based on the delay time.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a clustering method which is capable of minimizing the number of CHs and GWs, which consume relatively larger energy, in a wireless sensor network (WSN).

The present invention also provides a clustering method which is capable of parallel setting GWs for clustering time minimization.

The present invention also provides a clustering method which is capable of preventing unnecessary increase of GWs and instead maintaining ON, which consumes relatively small energy.

According to an aspect of the present invention, there is provided a clustering method of a WSN, which includes determining a number of initial nodes (INs) within radio range of ONs, the ONs within radio range of a CH; and setting a ON having a highest number of INs among the ONs within radio range of the CH, as a GW.

The clustering method may further include, when there is a plurality of ONs having the highest number of INs in the radio range of the CH, setting an ON having a lowest ID among the plurality of ONs, as the GW.

The determining the number of INs may include: the CH broadcasting a GW setting start message to the ONs within radio range of the CH, the ONs each broadcasting an IN number request message to the INs within radio range of the ONs in response to the received GW setting start message, the INs each transmitting an IN number response message to the ONs in response to the IN number request messages received from the ONs, the ONs each counting the number of the IN number response messages received from the INs and determining the number of INs within radio range of the ONs, and the ONs each transmitting an IN number report message to the CH, the IN number report message containing the determined number of INs. The GW setting may include the CH comparing and analyzing the IN number report messages from the ONs to determine an ON with a highest number of INs, as the GW.

In the transmitting the IN number response messages may further include, the INs receiving the IN number request messages from the plurality of ONs transmitting the IN number response messages to the ONs once.

The clustering method may further included determining a number of ONs existing in a radio range of INs, the INs existing in a radio range of the set GW; and setting an IN having a highest number of ONs among the INs in the radio range of the GW, as a CH of a neighboring cluster.

According to another aspect of the present invention, there is provided a clustering method of a wireless sensor network (WSN) comprising: determining a number of ONs within radio range of INs, the INs within radio range of a GW; and setting an IN having a lowest number of ONs among the INs in the radio range of the GW, as a CH of a neighboring cluster.

The clustering method may further include, when there is a plurality of INs having the lowest number of ONs in the radio range of the GW, setting an IN having a lowest ID among the plurality of INs as the CH of the neighboring cluster.

The determining the number of ONs comprises: the GW broadcasting a CH setting start message to the INs within radio range of the GW; the INs each broadcasting an ON number request message to the ONs within radio range of the INs, in response to the received CH setting start message; the ONs each transmitting an ON number response message to the INs in response to the ON number request messages received from the INs; the INs each counting the number of the ON number response messages received from the ONs and determining the number of ONs existing within radio range of the INs; and the INs each transmitting an ON number report message to the GW, the ON number report message containing the determined number of ONs. The CH setting comprises the GW comparing and analyzing the ON number report messages from the INs to determine an IN with a lowest number of ONs, as the CH of the neighboring cluster.

In the transmitting the ON number response messages, the ONs receiving the ON number request messages from the plurality of INs may transmit the ON number response messages to the INs once.

The clustering method may further include determining a number of INs within radio range of ONs, the ONs within radio range of the CH which is set as the CH of the neighboring cluster; and setting an ON having a highest number of INs among the ONs in the radio range of the CH, as the GW.

Additionally, when setting the CH of the neighboring cluster is completed, the GW may transmit a parallel GW setting start message to the CH by which the GW is set as the GW, and the CH, which receives the GW setting start message, may set one among the ONs in the radio range of the CH as a GW.

Additionally, when the number of INs existing in the radio range of the GW is not more than a predetermined number, the step of setting the CH of the neighboring cluster may be skipped.

Additionally, when the step of setting the CH of the neighboring cluster is skipped, the INs in the radio range of the GW may be set as slave nodes (SNs) of the GW.

BRIEF DESCRIPTION OF THE DRAWINGS

The above objects and/or aspects of the present invention will become more apparent by describing in detail certain exemplary embodiments thereof with reference to the attached drawings, in which.

DETAILED DESCRIPTION OF THE EXEMPLARY EMBODIMENTS

Hereinafter, the present invention will be described in detail with reference to the drawings.

A clustering method according to one exemplary embodiment of the present invention proposes repeating sequential processes of: i) setting an initial cluster, ii) setting a GW, iii) and setting a CH. The processes ii) and iii) are repeated adaptively according to the processes of: iv) parallel GW setting; and v) limited CH setting.

The process of setting components of a clustering according to one exemplary embodiment of the present invention will now be described below.

Figure 1A:
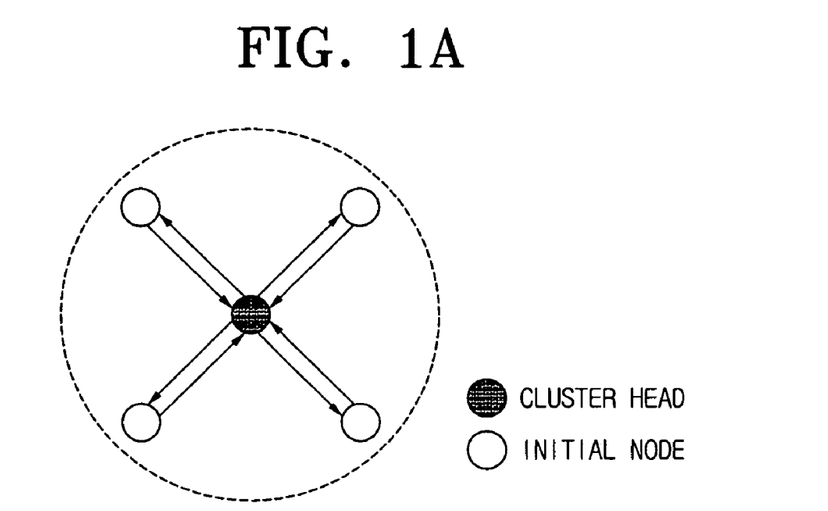
FIGS. 1A and 1B are views provided for explaining an initial cluster setting process among the processes of clustering according to an exemplary embodiment of the present invention.
Figure 1B:
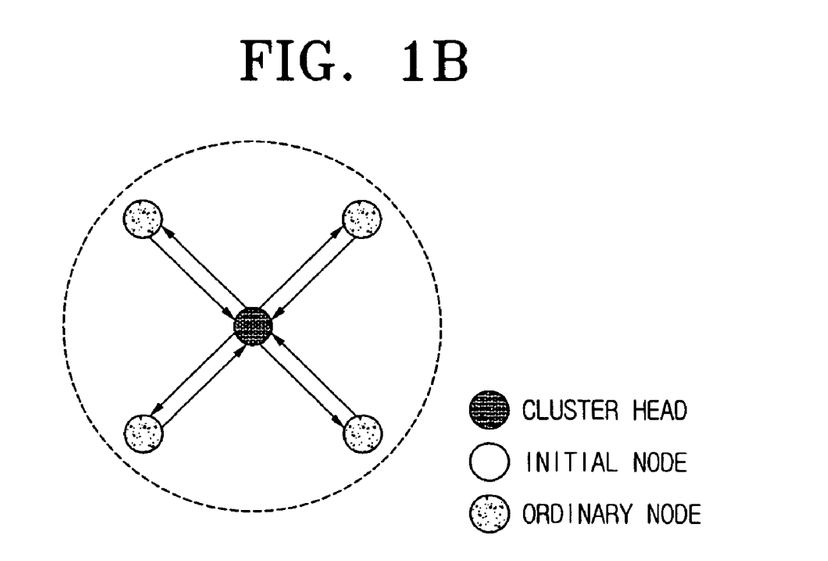

First, the first process of the clustering, which is i) setting an initial cluster, will be described in detail with reference to FIGS. 1A and 1B. FIGS. 1A and 1B are views provided for explaining an initial cluster setting process among the processes of clustering according to an embodiment of the present invention.

FIG. 1A shows one CH and four INs within the radio range (indicated by dotted circle).

For the initial setting of a cluster, first, CH broadcasts advertisement message to the INs in the same radio range. The INs, receiving the advertisement message, transmits a joining request message back to the CH.

Accordingly, the CH registers the INs sending the joining request message as the members of the cluster. The CH then transmits a beacon to the INs of the same radio range. INs receiving the beacon turn into ONs. Accordingly, cluster initial setting is completed. FIG. 1B shows the INs of FIG. 1A turned into ONs.

Figure 2A:
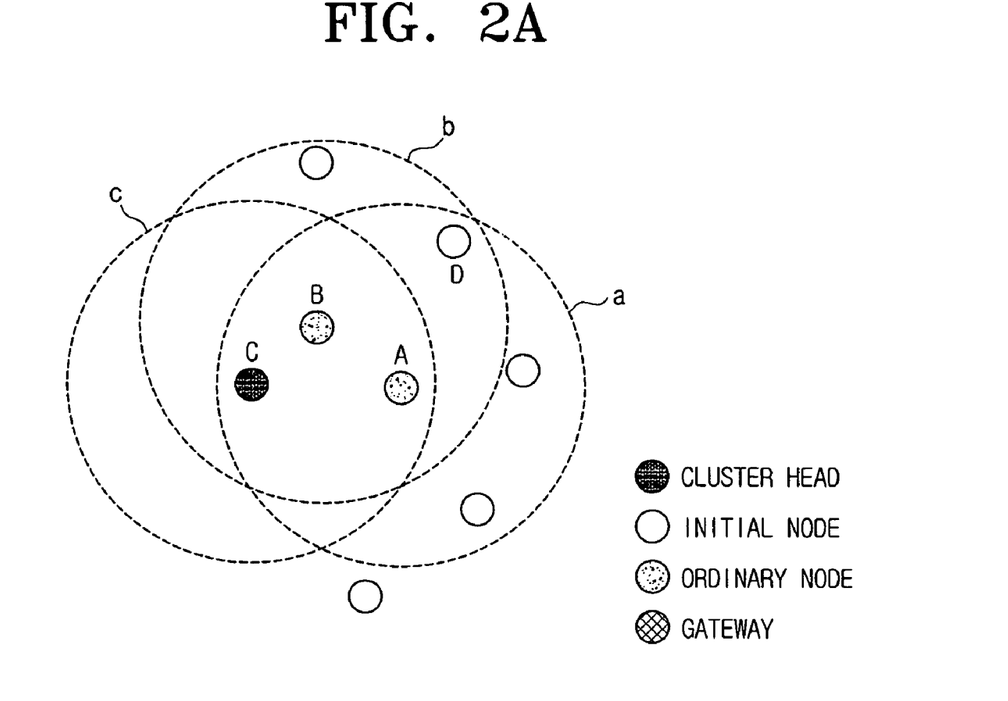
FIGS. 2A and 2B are views provided for explaining a GW setting process among the processes of clustering according to an exemplary embodiment of the present invention.
Figure 2B:
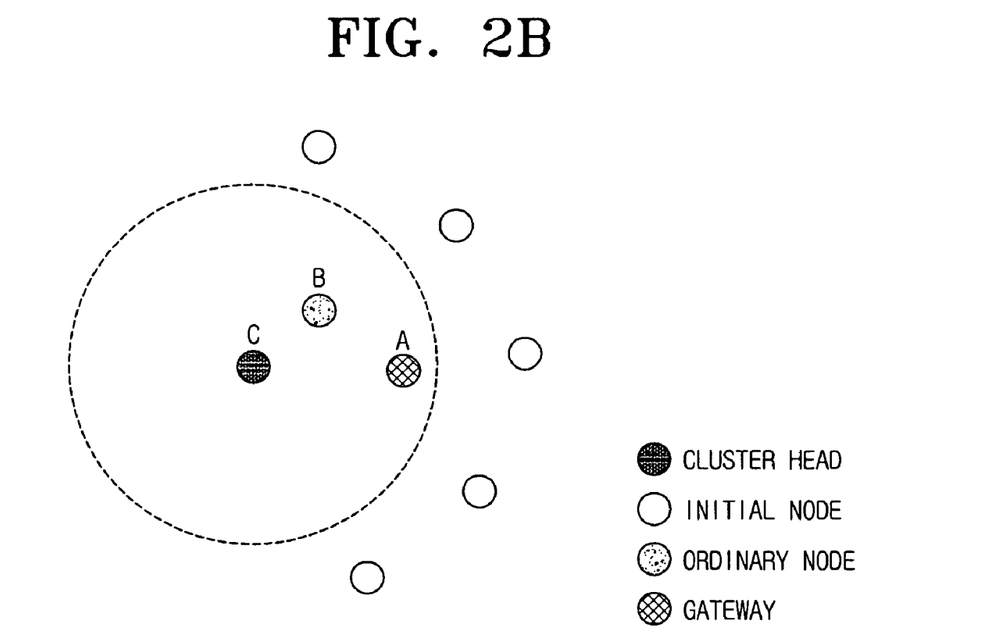

The process of ii) GW setting will be described with reference to FIGS. 2A and 2B. FIGS. 2A and 2B are views provided for explaining a GW setting process among the processes of clustering according to an exemplary embodiment of the present invention.

Because the GW takes routing jobs between the clusters, it always needs be in 'on' status. Accordingly, the GW consumes larger energy than the other nodes, and therefore, it is preferable to minimize the number of GWs in the WSN in the for energy efficiency.

In order to minimize the number of GWs, the present exemplary embodiment suggests to set the ON having the maximum number of INs in the same radio range as a GW. The cluster is interpreted as the radio range of a CH in this description.

Referring to FIG. 2A, the cluster (c) has two ONs, that is, ON(A) and ON(B), and there are three INs in the radio range (a) of ON(A), and two INs in the radio range (b) of ON (B). Accordingly, ON(A), having higher number of INs within radio range, is set to GW. FIG. 2B shows the result of setting ON(A) of FIG. 2B as GW.

For GW setting, a CH first broadcasts a GW_SETUP_START message to the ONs within the radio range. ONs receiving the GW_SETUP_START message broadcast a IN-COUNT_REQ message to the INs within radio range. INs receiving the IN_COUNT_REQ message transmit an IN_COUNT_ACK message to the ONs sending out the IN_COUNT_REQ message.

INs, receiving the IN_COUNT_REQ message from a plurality of ONs may send back an IN_COUNT_ACK message only once, because ONs transmitting the IN_COUNT_REQ message to the IN can receive all IN_COUNT_ACK messages. For example, as shown in FIG. 2A, IN(D) receives the IN_COUNT_REQ message from a plurality of ONs-say, ON(A), ON(B). Although IN(D) sends back the IN_COUNT_ACK message once, the message can be received by both ON(A) and ON(B).

Next, the ONs count the number of IN_COUNT_ACK messages received from the INs, and confirm the number of INs existing in the same radio range. The ONs then transmit an IN_COUNT_REPORT message containing the confirmed number of INs to the CH.

The CH compares and analyzes the IN_COUNT_REPORT messages from the ONs, and sets an ON with the largest number of INs as the GW. If there are several ONs having the largest number of INs, the ON with lowest ID may be set as GW.

If all the ONs have '0' INs, CH does not set a GW, and clustering is finished, because the WSN does not have INs in it. Otherwise, GW setting is performed and the next process, iii), CH setting is performed as explained below.

As the GW setting is completed in the way explained above, the number of large energy-consuming GWs can be minimized.

The process of iii) CH setting will now be described with reference to FIGS. 3A to 3D. In particular, FIGS. 3A to 3D are views provided for explaining a CH setting process among the processes of clustering according to an exemplary embodiment of the present invention.

The CH transmits a query to the GW and an ON, aggregates data from the GW and the ON and transmits the data, and therefore, needs be in 'on' state all the time. Accordingly, the CH requires relatively large amounts of energy, and therefore, it is preferable to minimize the number of CHs in the WSN for the sake of better energy efficiency.

In order to minimize the number of CHs, it is suggested that an IN among the INs in the radio range of the GW that has the least number of ONs in its radio range, be set as the CH of the neighboring cluster.

Figure 3A:
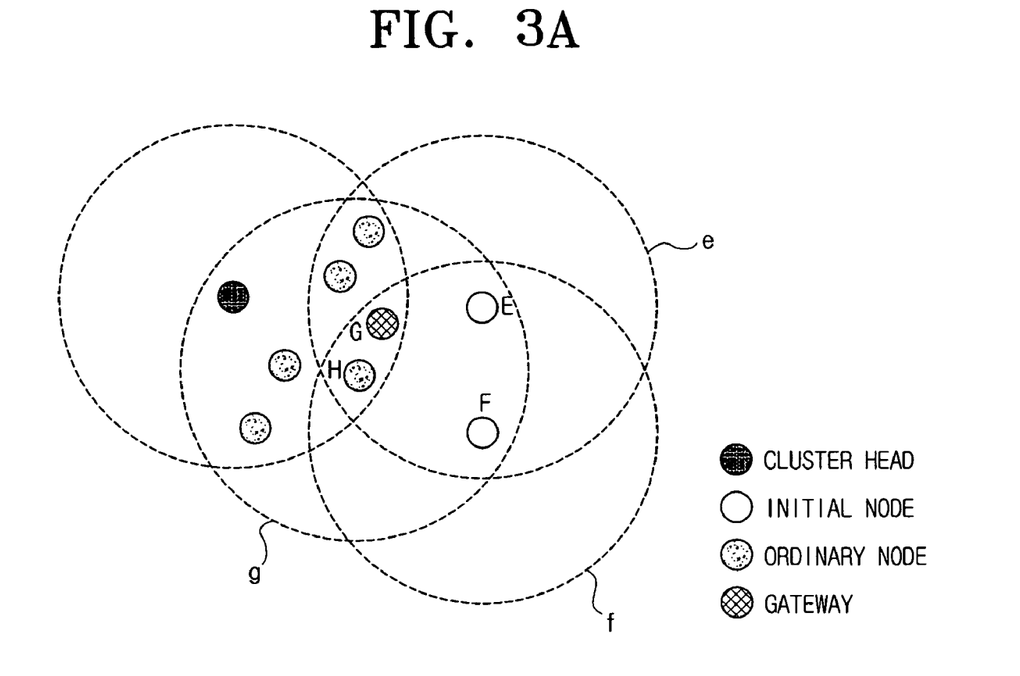
FIGS. 3A to 3D are views provided for explaining a CH setting process among the processes of clustering according to an exemplary embodiment of the present invention.
Figure 3B:
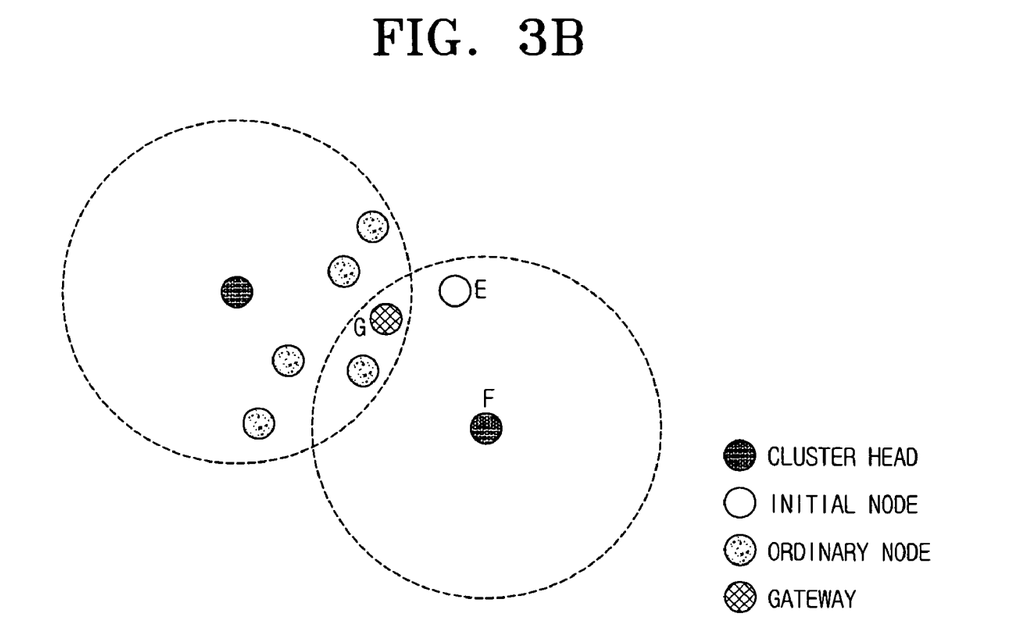

Referring to FIG. 3A, there are two INs, that is, IN(E) and IN(F), within the radio range (g) of the GW, with IN(E) having three ONs in the radio range (e) and IN(F) having one ON in the radio range (f). Accordingly, IN(F), having fewer ONs in the radio range, is set to be the CH of the neighboring cluster. FIG. 3B shows IN(F) of FIG. 3A being set to the CH of the neighboring cluster.

In order to set the CH, first, the GW broadcast a CH_SETUP_START message to the INs within radio range. INs receiving the CH_SETUP_START messages each broadcasts an ON_COUNT_REQ messages to the ONs within its radio range. ONs receiving the ON_COUNT_REQ messages transmit an ON_COUNT_ACK messages back to the INs which transmitted the ON_COUNT_REQ messages.

When an ON receives ON_COUNT_REQ messages from a plurality of INs, the ON may transmit an ON_COUNT_ACK message only once. Because all the INs transmitting ON_COUNT_REQ messages to an ON can receive ON_COUNT_ACK message. For example, with reference to FIG. 3A, ON(H) receives ON_COUNT_REQ messages from a plurality of INs such as IN(E) and IN(F). In other words, although ON(H) transmits the ON_COUNT_ACK message only once, the message can be received at all of the INs-IN(E), IN(F)-transmitting ON_COUNT_REQ messages.

Next, each IN counts the number of ON_COUNT_ACK messages received from ONs, and confirms the number of ONs existing in its radio range. The INs then transmit ON_COUNT_REPORT messages containing the confirmed number of ONs to the GW.

The GW compares and analyzes the ON_COUNT_REPORT messages received from INs, and sets an ON having the least number of ONs as the CH of the neighboring cluster. If a plurality of INs have the same least number of ONs, the IN with the lowest ID may be set as the CH of the neighboring cluster.

Figure 3C:
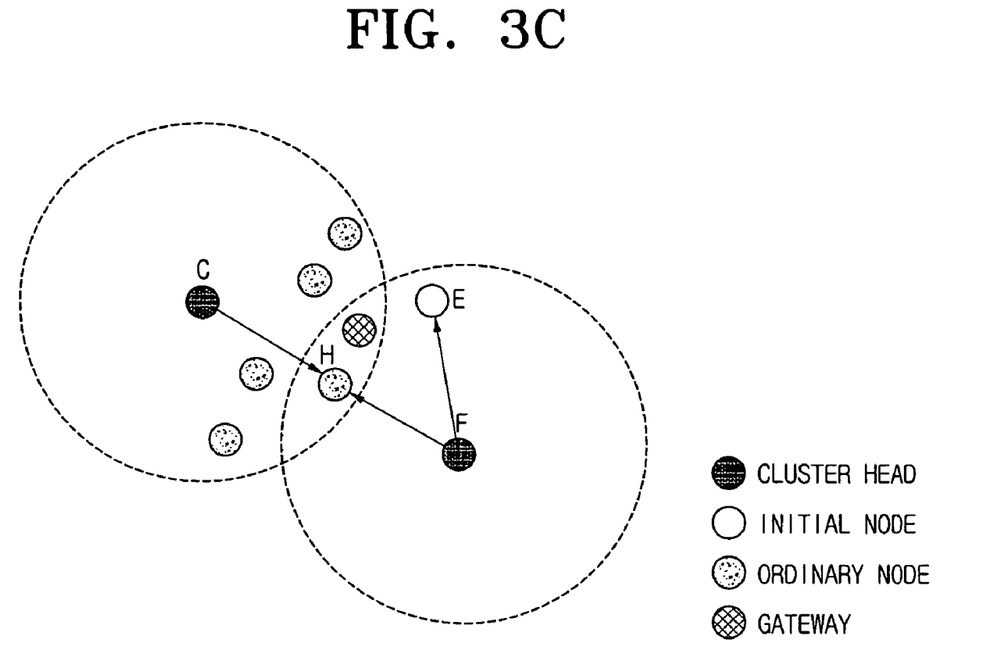
Figure 3D:
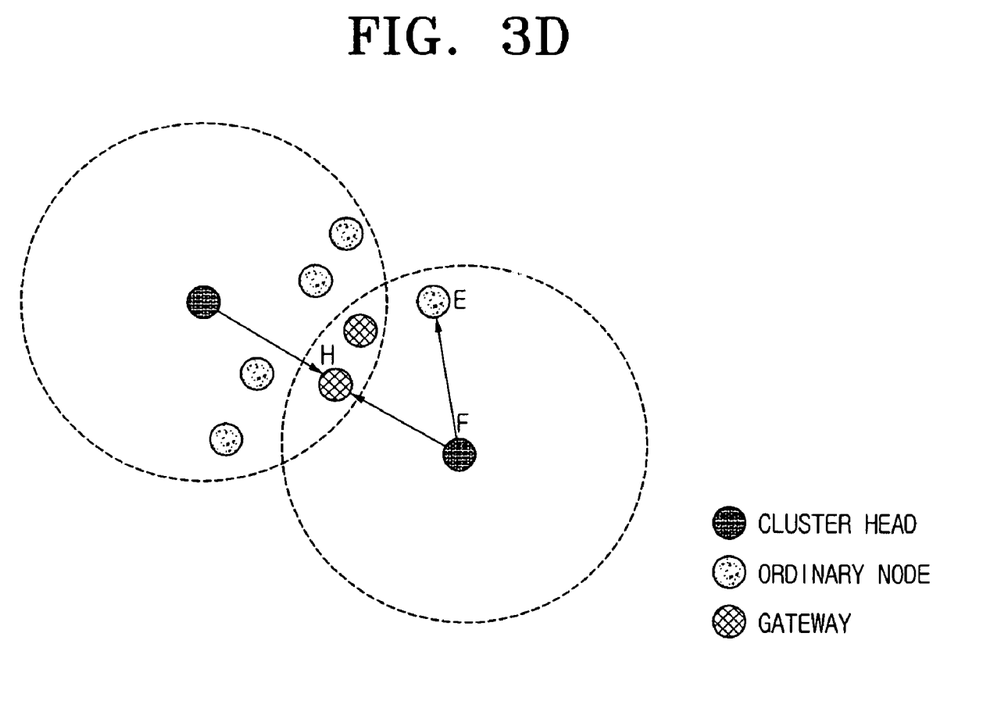

Accordingly, as the CH is newly designated, as shown in FIG. 3C, the new CH broadcasts advertisement messages to IN(E) in its radio range. IN(E), receiving the advertisement message, transmits a joining request message to CH(F) and thus, CH(F) registers IN(E) as a member of the cluster. CH(F) then transmits a beacon to IN(E) which is in its radio range. IN(E) turns into an ON. Also, as shown in FIG. 3C, ON(H), upon receiving a beacon from two or more CHs-CH(C), CH(F)-turns into a GW. FIG. 3D shows IN(E) of FIG. 3C turning into an ON, and ON(H) of FIG. 3C turning into a GW.

If there is no IN transmitting an ON_COUNT_REPORT message, GW does not set CH of the neighboring cluster and therefore, clustering is finished, because there is no IN in the wireless sensor network. Meanwhile, if there is at least one IN transmitting an ON_COUNT_REPORT message, CH setting is performed and then the process of ii) GW setting is performed.

Accordingly, when the CH is set as described above, the number of large energy-consuming CHs can be minimized.

Figure 4:
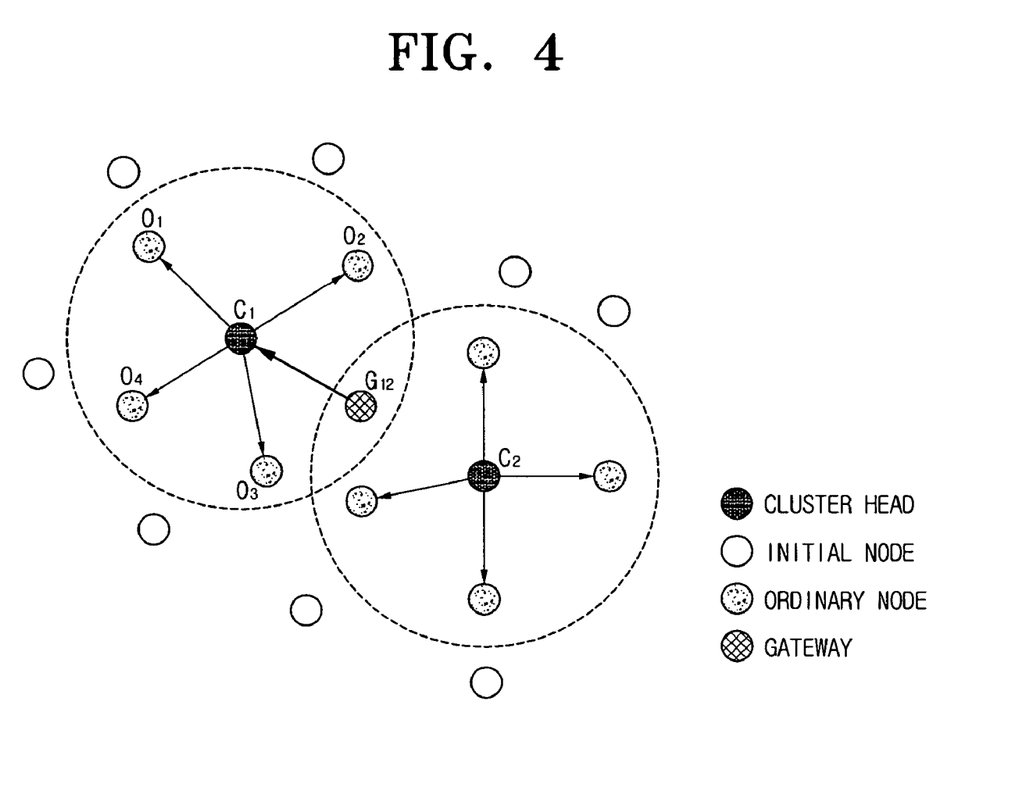
FIG. 4 is a view provided for explaining a parallel GW setting process among the processes of clustering according to an exemplary embodiment of the present invention.

The process of iv) parallel GW setting will now be explained with reference to FIG. 4. FIG. 4 is a view provided for explaining a parallel GW setting process among the processes of clustering according to an exemplary embodiment of the present invention.

The 'parallel GW setting' refers to a process in which GW setting and CH setting are performed spreadingly in various directions.

For the parallel GW setting, a GW, having completed CH setting of neighboring cluster, transmits a REGW_SETUP_START (that is, to start parallel GW setting) message to the CH for which it has been designated the GW. The CH, which receives the REGW_SETUP_START message, performs the GW setting process with respect to the ONs existing in the cluster.

For example, as shown in FIG. 4, GW(G12), which completed setting of CH(C2) of the neighboring cluster, transmits a REGW_SETUP_START message to the CH(C1) for which it is set as the GW. CH(C1), receiving REGW_SETUP_START message, performs GW setting with respect to the ONs (O1, O2, O3, O4) existing in the cluster. CH(C1) sets the ON with a maximum number of INs in the radio range as the GW.

According to the above parallel GW setting, GW and CH settings are performed spreadingly in various directions, clustering time shortens.

In the above description, the CH setting process is performed when there is even one IN which transmits an ON_COUNT_REPORT message. There is a possibility that a CH with a few, or no ONs in the radio range, will be generated. When such a CH is generated, the number of GWs may also increase. This is energy inefficient as it increases the number of highly energy-consuming CHs and GWs.

Figure 5A:
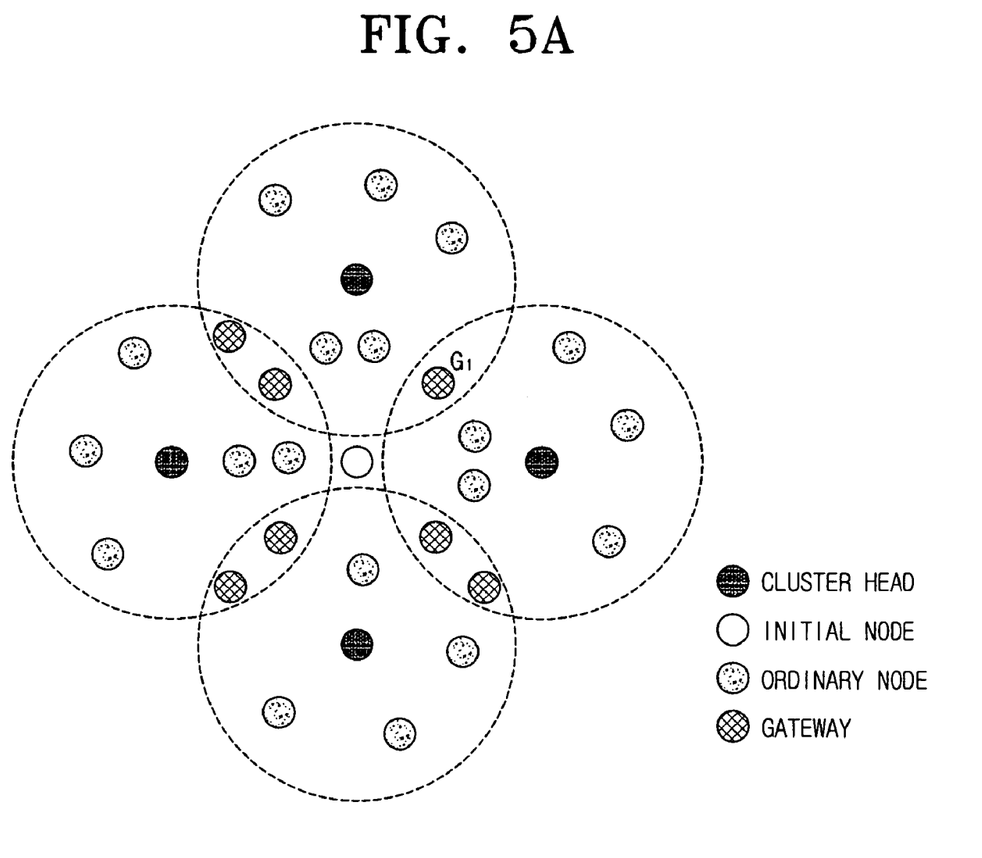
FIGS. 5A to 5C are views provided for explaining a limited CH setting process among the processes of clustering according to an exemplary embodiment of the present invention.
Figure 5B:
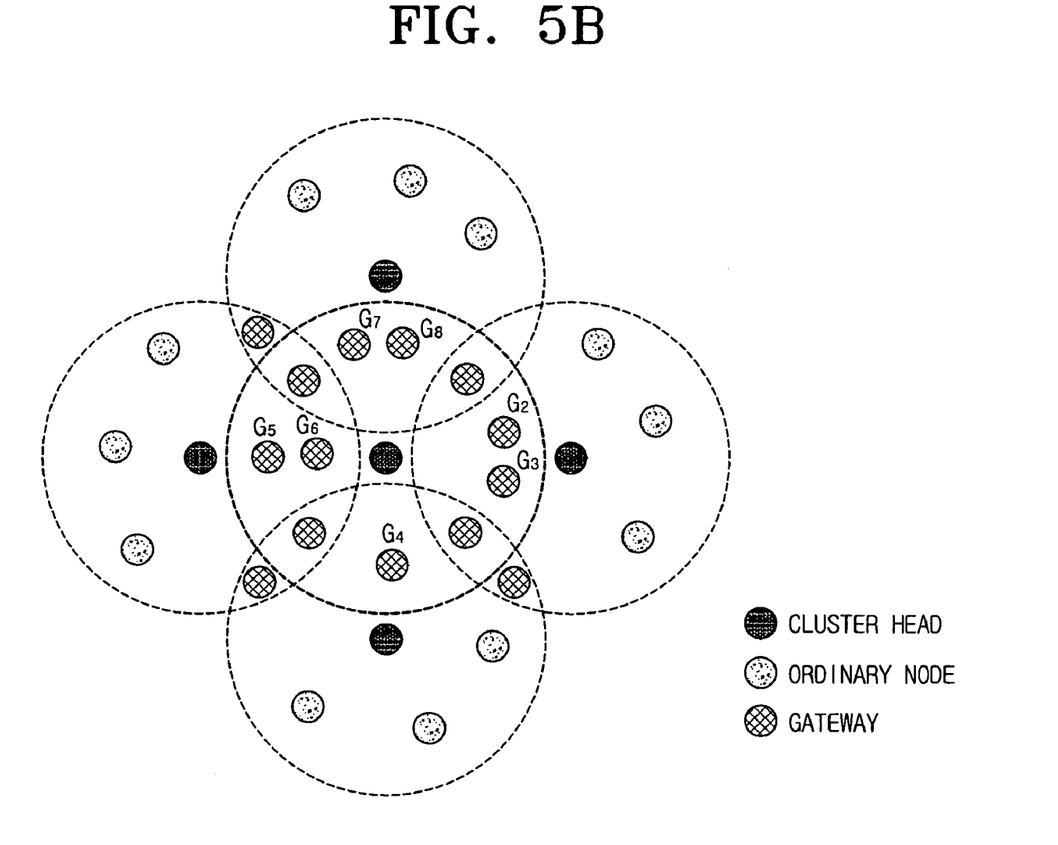

As shown in FIG. 5A for example, GW(G1), which receives the ON_COUNT_REPORT message from IN(I), sets IN(I) as the CH of the neighboring cluster. FIG. 5B shows that IN(I) is set to CH of the neighboring cluster and seven GWs (G2 to G8) are increased accordingly. Thus it can be understandable that energy efficiency of the WSN would decrease.

The present exemplary embodiment of the invention suggests v) limited CH setting in order to prevent the above problem.

'Limited CH setting' means the CH of the neighboring cluster is not set when there is a small number of INs within radio range of the GW. More specifically, when there is a small number of INs transmitting ON_COUNT_REPORT messages to a GW (for example, when number of INs ≦2), the CH of the neighboring cluster is not set. Of course, the threshold to determine whether to set the CH of the neighboring cluster or not, is not limited to '2' as in the above example.

Figure 5C:
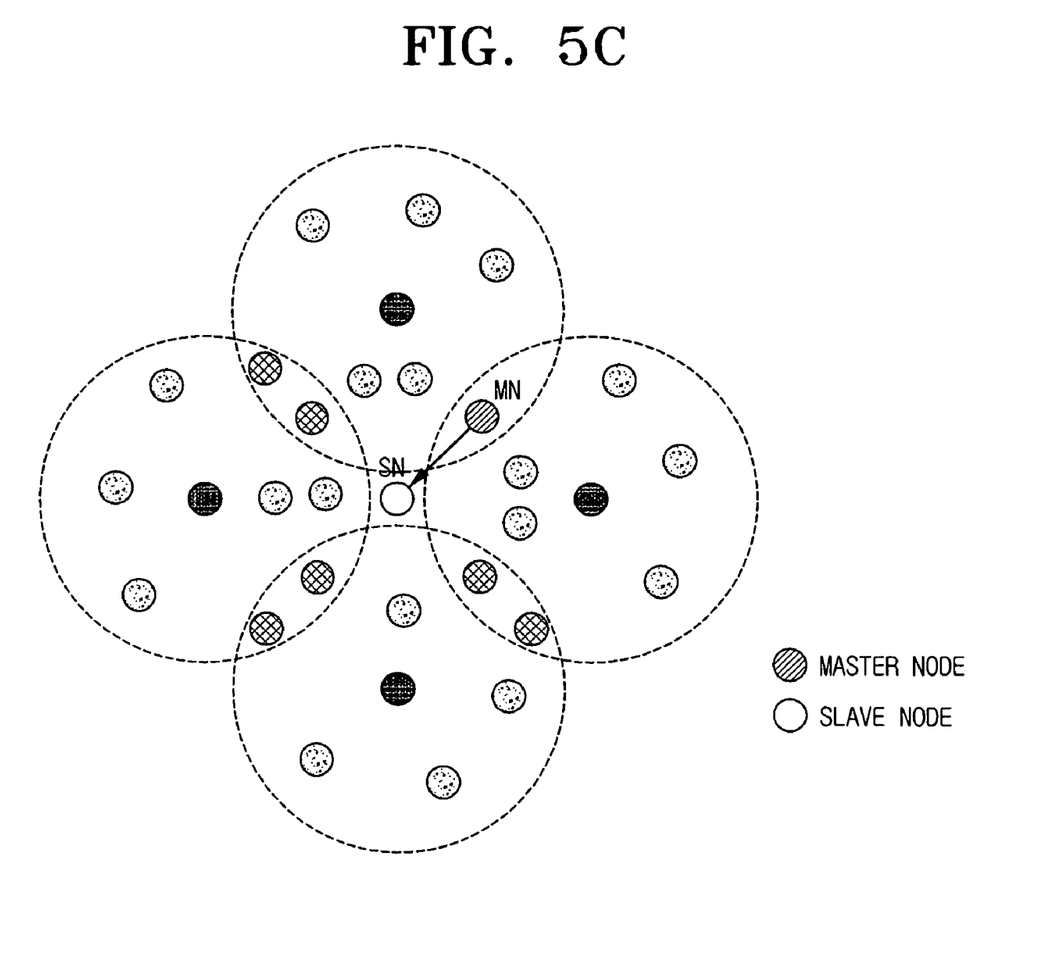

Accordingly, when there is a small number of INs within radio range of a GW, the GW becomes a master node (MN) of a IN, and the IN becomes a slave node of the GW, and both communicate with each other. FIG. 5C shows the GW becoming a MN of the IN, and the IN becoming a SN of the GW.

The WSN of FIG. 5C has a smaller number of CHs and GWs than that of FIG. 5B, while it has a larger number of ONs.

According to such limited CH setting, increasing CHs and GWs can be prevented, and ONs, which have relatively small consumption of energy, are maintained. Therefore, the energy efficiency of WSN can be prevented from deteriorating.

The computer simulation results of a clustering method according to an exemplary embodiment of the present invention will now be described in greater detail below with reference to FIGS. 6A to 6G.

The simulation compared and analyzed a generally available Least ID clustering and Distance-based Topology Discovery method, with the clustering according to an exemplary embodiment of the present invention. As a result, it was confirmed that the clustering according to the exemplary embodiment of the present invention is an improvement over alternative clustering methods.

The environments of the computer simulation are as follows:

Total number of nodes: 500-1,500
Area: Length 50 m * Width 50 m
Transmission distance: 5 m
Random distribution of each node The number of generations of each node is an average obtained after 500 simulations with different node distributions.

Figure 6A:
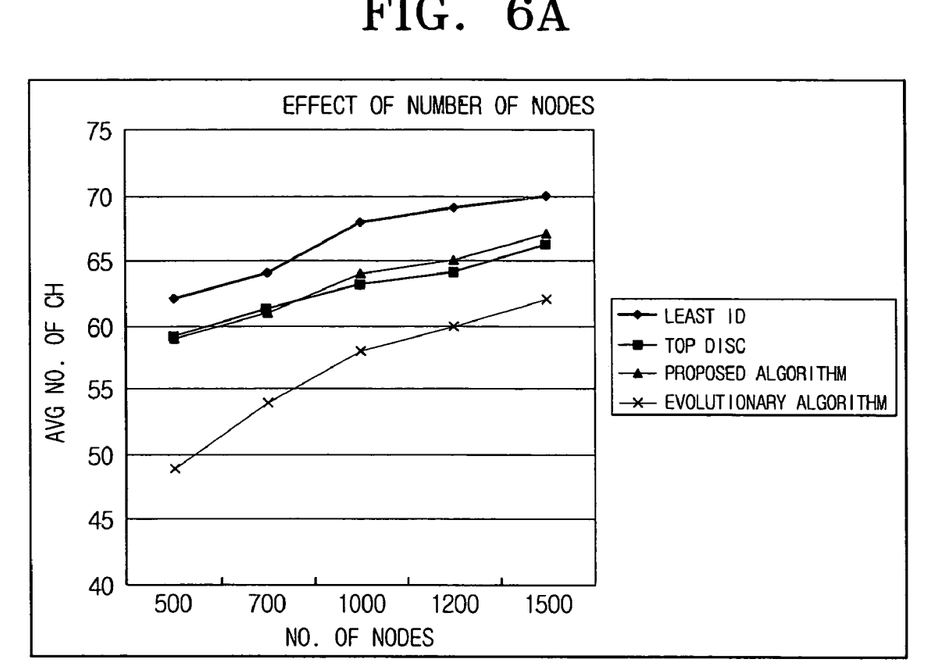
FIGS. 6A to 6G are views showing computer simulations of clustering according to an exemplary embodiment of the present invention.

FIG. 6A shows the average effect of the number of CHs of entire nodes according to the clustering types. Given the same environments, the proposed algorithm according to the exemplary embodiment of the present invention can reduce a maximum of 6% of CHs when compared to Least ID clustering, and provide performance similar to the Topology Discovery method. The Evolutionary algorithm according to the limited CH setting of the exemplary embodiment of the present invention, which sets INs as SNs instead of setting the CH when there is not more than two INs around a GW, can also reduce a maximum of 21% of CHs when compared to the Least ID clustering.

Figure 6B:
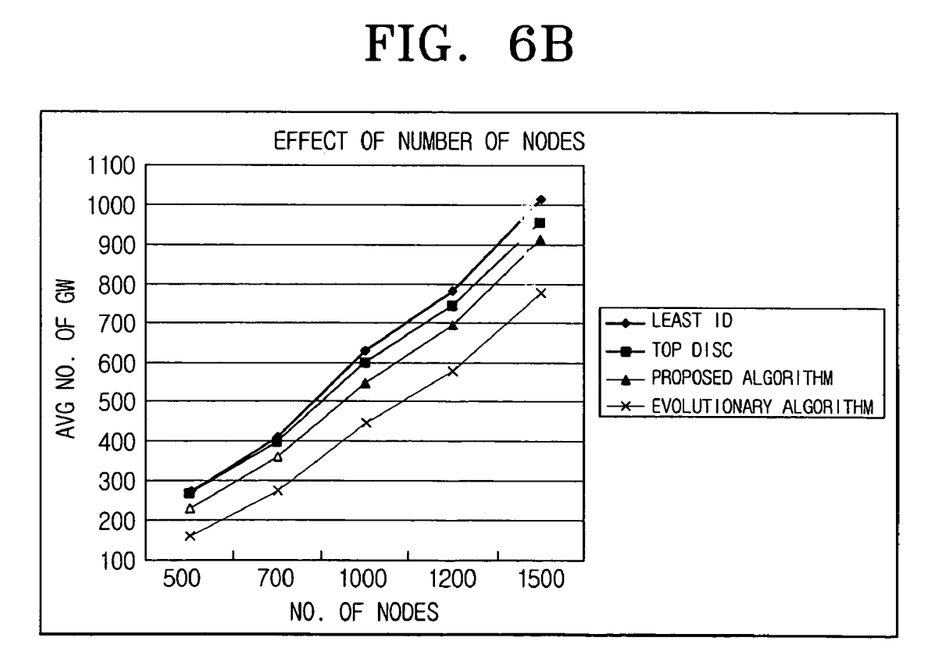

FIG. 6B shows the average effect of the number of GWs of entire nodes according to the clustering types. Given the same environments, the proposed algorithm according to the embodiment of the present invention can reduce a maximum of 13% of GWs when compared to Least ID clustering, and provide performance similar to the TopDisc method. The Evolutionary algorithm according to the limited the CH setting of the exemplary embodiment of the present invention, which sets INs as SNs instead of setting the CH when there is not more than two INs around GW, can also reduce a maximum of 40% of GWs when compared to Least ID clustering.

Figure 6C:
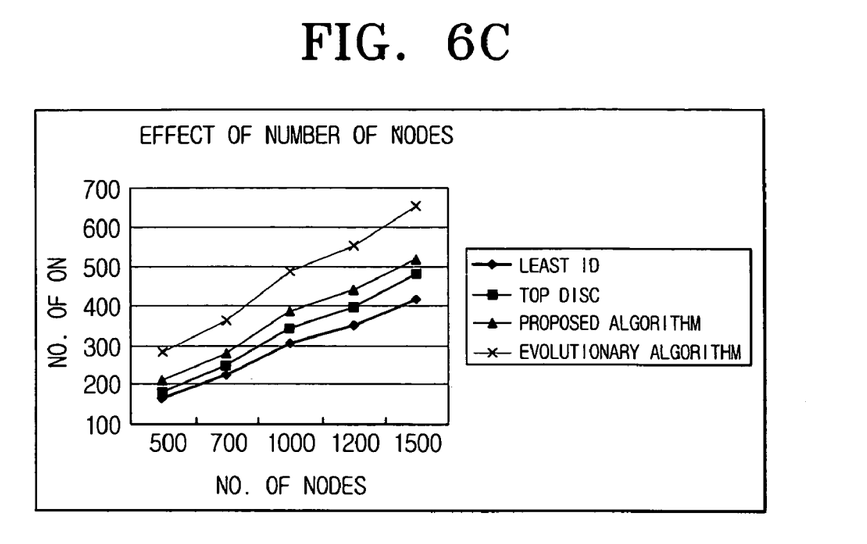
Figure 6D:
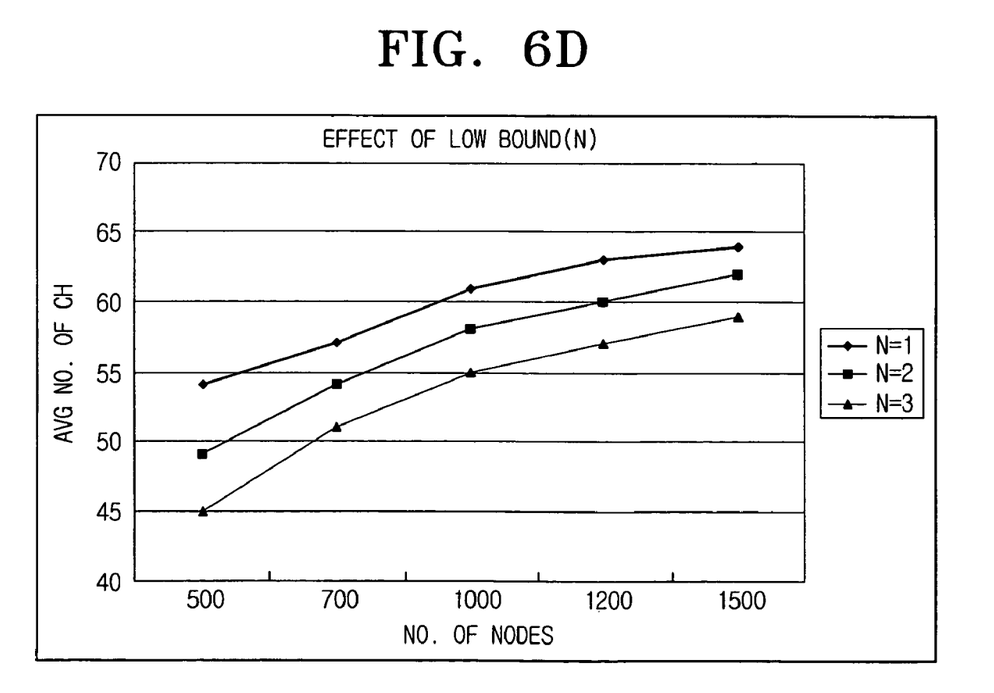
Figure 6E:
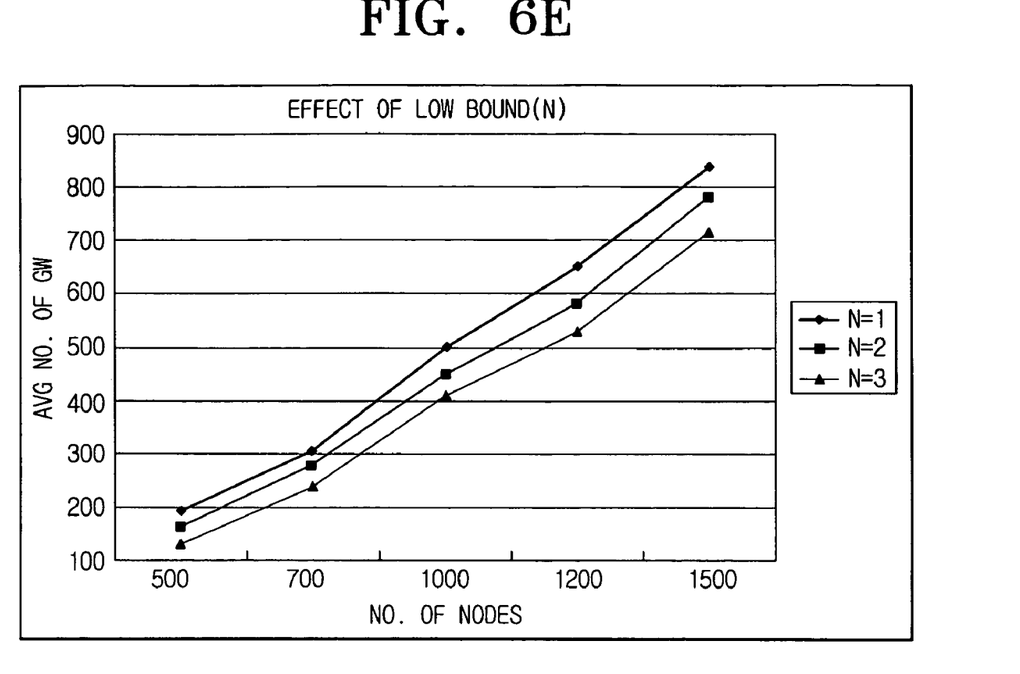
Figure 6F:
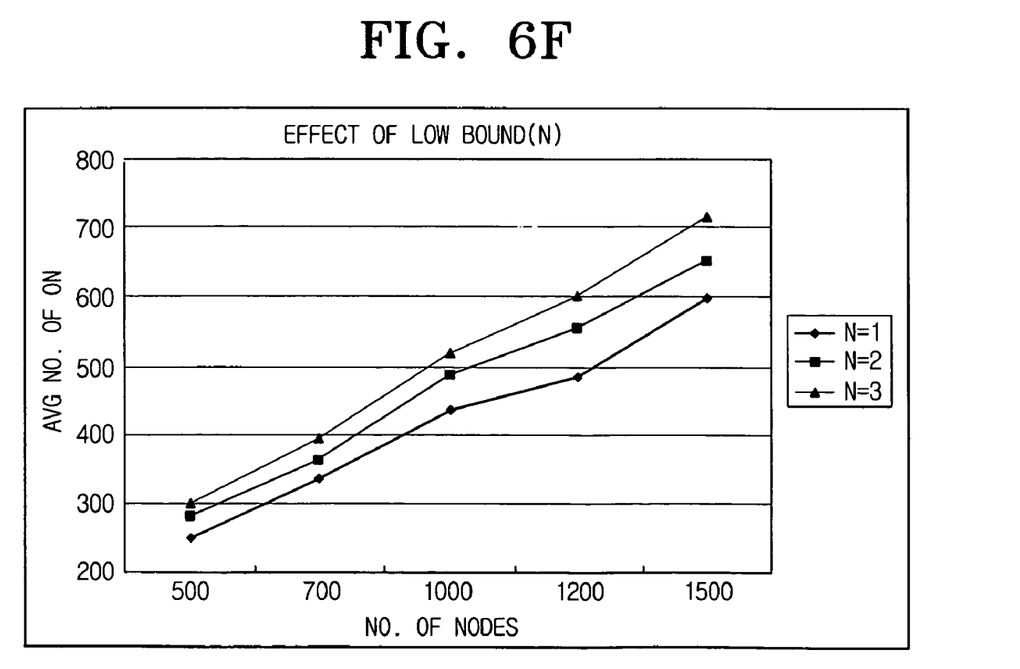
Figure 6G:
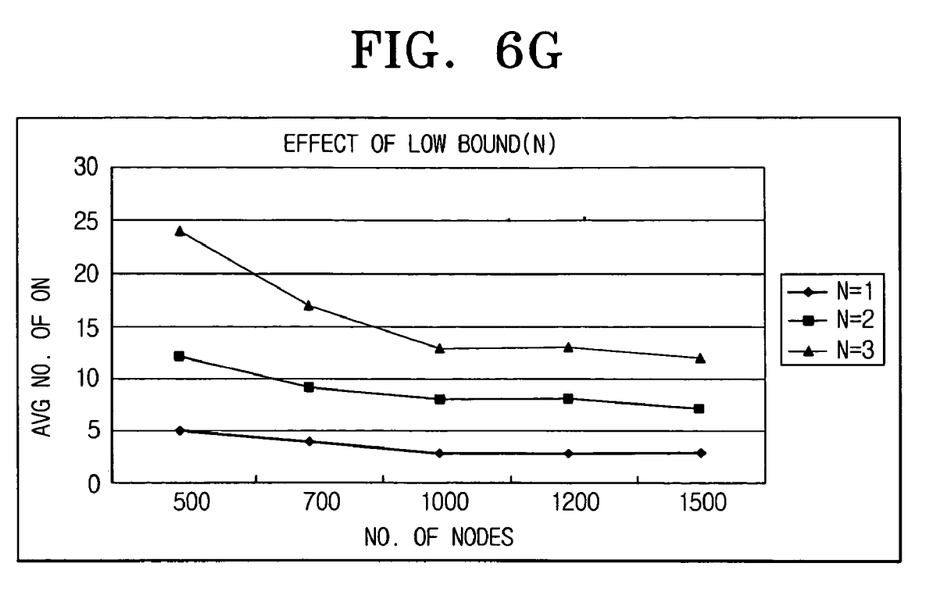

FIG. 6C shows the average effect of the number of ONs of entire nodes according to the clustering types. Given the same environments, the proposed algorithm according to the exemplary embodiment of the present invention can increase a maximum of 29% of ONs when compared to Least ID clustering, and provide performance similar to the TopDisc method. The Evolutionary algorithm according to the limited CH setting of the exemplary embodiment of the present invention, which sets INs as SNs instead of setting CH when there is not more than two INs around GW, can also increase a maximum of 66% of ONs when compared to Least ID clustering.

FIGS. 6D to 6G show the averages of the effect of the number of CHs, GWs, ONs, and SNs with the variation of N, according to the limited CH setting which sets INs as SNs instead of setting the CH when there is not more than two INs around GW. As shown, the CH and GW decrease as N increases, and the ON and SN increase as N increases.

As described above in a few exemplary embodiments of the present invention, the number of CHs and GWs, which generally consume larger energy than the others, can be minimized in the wireless sensor network (WSN). Therefore, improving energy efficiency of a WSN.

Additionally, clustering time can be shortened according to parallel GW setting. Unnecessary generation of CHs and subsequent increase of GWs can be prevented, and relatively energy-economic ONs can be maintained. Therefore, energy efficiency of WSN even improves.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope.

What is claimed is:

1. A clustering method to minimize energy consumption of a wireless sensor network, the clustering method comprising:

determining a number of initial nodes within radio range of ordinary nodes, the ordinary nodes existing within radio range of a cluster head, wherein an ordinary node is a node that detects events that occur in a corresponding area and transmits information to a cluster head of a same cluster to which the ordinary node belongs;

setting an ordinary node having a highest number of initial nodes among the ordinary nodes within radio range of the cluster head, as a gateway; and using one of a least identification (ID) clustering in which each of the nodes in the wireless sensor network transmit a message having a sending node's ID to neighboring nodes within radio range, a linked clustering by allocating unique slots to the nodes in the wireless sensor network, and a topology discovery (TopDisc) clustering to minimize a number of cluster heads and gateways by minimizing a distance between cluster heads and gateways.

2. The clustering method of claim 1, further comprising if there is a plurality of ordinary nodes having the highest number of initial nodes within radio range of the cluster head, setting an ordinary node having a lowest identifier among the plurality of ordinary nodes, as the gateway.

3. The clustering method of claim 1, wherein the determining the number of initial nodes comprises:

the cluster head, broadcasting a gateway setting start message to the ordinary nodes within radio range of the cluster head;

the ordinary nodes, each broadcasting an initial node number request message to the initial nodes within radio range of the ordinary nodes, in response to receiving the gateway setting start message;

the initial nodes, each transmitting an initial node number response message to the ordinary nodes in response to the initial node number request messages received from the ordinary nodes;

the ordinary nodes, each counting a number of the initial node number response messages received from the initial nodes and determining a number of initial nodes within radio range of the ordinary nodes; and the ordinary nodes, each transmitting an initial node number report message to the cluster head, the initial node number report message containing the determined number of initial nodes, and wherein the setting the ordinary node having the highest number of initial nodes among the ordinary nodes within radio range of the cluster head, as the gateway comprises the cluster head, comparing and analyzing the initial node number report messages from the ordinary nodes to determine the ordinary node having the highest number of initial nodes, as the gateway.

4. The clustering method of claim 3, wherein in the transmitting the initial node number response messages, the initial nodes receiving the initial node number request messages from the plurality of ordinary nodes transmit the initial node number response messages to the ordinary nodes once.

5. The clustering method of claim 1, further comprising:

determining a number of ordinary nodes within radio range of initial nodes, the initial nodes existing within radio range of the set gateway; and setting an initial node having a highest number of ordinary nodes among the initial nodes within radio range of the gateway, as a cluster head of a neighboring cluster.

6. A clustering method to minimize energy consumption of a wireless sensor network, the clustering method comprising:

determining a number of ordinary nodes within radio range of initial nodes, the initial nodes existing within radio range of a gateway, wherein an ordinary node is a node that detects events that occur in a corresponding area and transmits information to a cluster head of a same cluster to which the ordinary node belongs;

setting an initial node having a lowest number of ordinary nodes among the initial nodes within the radio range of the gateway, as a cluster head of a neighboring cluster; and using one of a least identification (ID) clustering in which each of the nodes in the wireless sensor network transmit a message having a sending node's ID to neighboring nodes within radio range, a linked clustering by allocating unique slots to the nodes in the wireless sensor network, and a topology discovery (TopDisc) clustering to minimize a number of cluster heads and gateways by minimizing a distance between cluster heads and gateways.

7. The clustering method of claim 6, further comprising if there is a plurality of initial nodes having the lowest number of ordinary nodes within radio range of the gateway, setting an initial node having a lowest identifier among the plurality of initial nodes, as the cluster head of the neighboring cluster.

8. The clustering method of claim 6, wherein the determining the number of ordinary nodes comprises:

the gateway, broadcasting a cluster head setting start message to the initial nodes within radio range of the gateway;

the initial nodes, each broadcasting an ordinary node number request message to the ordinary nodes within radio range of the initial nodes, in response to receiving the cluster head setting start message;

the ordinary nodes, each transmitting an ordinary node number response message to the initial nodes in response to the ordinary number request messages received from the initial nodes;

the initial nodes, each counting a number of the ordinary node number response messages received from the ordinary nodes and determining the number of ordinary nodes within radio range of the initial nodes; and the initial nodes, each transmitting an ordinary node number report message to the gateway, the ordinary node number report message containing the determined number of ordinary nodes, and wherein the setting the initial node having the lowest number of ordinary nodes among the initial nodes within the radio range of the gateway, as the cluster head of the neighboring cluster comprises the gateway, comparing and analyzing the ordinary node number report messages from the initial nodes to determine the initial node having the lowest number of ordinary nodes, as the cluster head of the neighboring cluster.

9. The clustering method of claim 6, wherein in the transmitting the ordinary node number response messages, the ordinary nodes receiving the ordinary node number request messages from the plurality of initial nodes transmit the ordinary node number response messages to the initial nodes once.

10. The clustering method of claim 6, further comprising:

determining a number of initial nodes within radio range of ordinary nodes, the ordinary nodes existing within radio range of the cluster head which is set as the cluster head of the neighboring cluster; and setting an ordinary node having a highest number of initial nodes among the ordinary nodes within radio range of the cluster head, as the gateway.

11. The clustering method of claim 6, further comprising:

if setting the cluster head of the neighboring cluster is completed, the gateway, transmitting a parallel gateway setting start message to the cluster head by which said gateway is set; and the cluster head, which receives the gateway setting start message, setting an ordinary node among the ordinary nodes within radio range of the cluster head as the gateway.

12. The clustering method of claim 6, further comprising if the number of initial nodes within radio range of the gateway is not more than a predetermined number, skipping the setting the cluster head of the neighboring cluster.

13. The clustering method of claim 12, further comprising if the setting the cluster head of the neighboring cluster is skipped, setting the initial nodes within radio range of the gateway as slave nodes of the gateway.

14. The clustering method of claim 1, wherein the gateway routes data between cluster heads, and wherein the cluster head receives data from and transmits data to the ordinary nodes existing within radio range of the cluster head.

15. The clustering method of claim 14, wherein the gateway routes data between the cluster head and a cluster head of a neighboring cluster.

16. The clustering method of claim 1, wherein the initial nodes do not exist within radio range of a determined cluster head.

* * * * *